United States Patent
Butler et al.

(10) Patent No.: US 9,690,984 B2
(45) Date of Patent: Jun. 27, 2017

(54) TWO-DIMENSIONAL INFRARED DEPTH SENSING

(71) Applicant: Microsoft Technology Licensing, LLC, Redmond, WA (US)

(72) Inventors: Ben Butler, Bellevue, WA (US); Vladimir Tankovich, Bellevue, WA (US); Cem Keskin, Cambridge (GB); Sean Ryan Francesco Fanello, Bellevue, WA (US); Shahram Izadi, Cambridge (GB); Emad Barsoum, Sammamish, WA (US); Simon P. Stachniak, Redmond, WA (US); Yichen Wei, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 66 days.

(21) Appl. No.: 14/686,528

(22) Filed: Apr. 14, 2015

(65) Prior Publication Data

US 2016/0307032 A1 Oct. 20, 2016

(51) Int. Cl.
*G06K 9/00* (2006.01)
*G06T 7/00* (2017.01)
*H04N 5/33* (2006.01)

(52) U.S. Cl.
CPC ..... *G06K 9/00355* (2013.01); *G06K 9/00208* (2013.01); *G06K 9/00375* (2013.01); *G06T 7/0051* (2013.01); *H04N 5/33* (2013.01)

(58) Field of Classification Search
CPC ........... G06K 9/00355; G06K 9/00375; G06K 9/00208; G06T 7/0051; H04N 5/33

USPC ......................................................... 382/154
See application file for complete search history.

(56) References Cited

U.S. PATENT DOCUMENTS

| 8,194,149 | B2 | 6/2012 | Thomas et al. | |
|---|---|---|---|---|
| 8,509,495 | B2 * | 8/2013 | Xu | G06K 9/00013 235/380 |
| 8,571,263 | B2 | 10/2013 | Shotton et al. | |
| 8,837,780 | B2 * | 9/2014 | Jia | G06K 9/00355 382/103 |

(Continued)

FOREIGN PATENT DOCUMENTS

WO 2014127431 A1 8/2014

OTHER PUBLICATIONS

Melax, et al., "Dynamics Based 3D Skeletal Hand Tracking", In Proceedings of Graphics Interface, May 29, 2013, pp. 63-70.

(Continued)

*Primary Examiner* — Daniel Mariam
(74) *Attorney, Agent, or Firm* — Alleman Hall Creasman & Tuttle LLP (57) ABSTRACT

A signal encoding an infrared (IR) image including a plurality of IR pixels is received from an IR camera. Each IR pixel specifies one or more IR parameters of that IR pixel. IR-skin pixels that image a human hand are identified in the IR image. For each IR-skin pixel, a depth of a human hand portion imaged by that IR-skin pixel is estimated based on the IR parameters of that IR-skin pixel. A skeletal hand model including a plurality of hand joints is derived. Each hand joint is defined with three independent position coordinates inferred from the estimated depths of each human hand portion.

20 Claims, 5 Drawing Sheets

(56) References Cited

U.S. PATENT DOCUMENTS

| | | | | |
|---|---|---|---|---|
| 8,994,652 | B2* | 3/2015 | Fleischmann | G06F 3/017 345/156 |
| 9,177,387 | B2* | 11/2015 | Marks | G06T 7/2033 |
| 2011/0129124 | A1* | 6/2011 | Givon | G06F 3/011 382/107 |
| 2013/0236089 | A1 | 9/2013 | Litvak et al. | |
| 2014/0098018 | A1 | 4/2014 | Kim et al. | |
| 2015/0084884 | A1* | 3/2015 | Cherradi El Fadili | G06F 3/0488 345/173 |
| 2016/0113592 | A1* | 4/2016 | Murugappan | A61B 5/7285 600/413 |

OTHER PUBLICATIONS

Romero, et al., "Non-Parametric Hand Pose Estimation with Object Context", In Journal of Image and Vision Computing, vol. 31, Issue 8, Aug. 2013, pp. 555-564.

Qian, et al., "Realtime and Robust Hand Tracking from Depth", In IEEE Conference on Computer Vision and Pattern Recognition, Jun. 23, 2014, 8 pages.

Chu, et al., "Real-Time 3D Body Pose Tracking from Multiple 2D Images", In Proceedings of the 5th international conference on Articulated Motion and Deformable Objects, Jul. 9, 2008, pp. 42-52.

Niebner, et al., "Real-time 3D Reconstruction at Scale using Voxel Hashing", In Journal of ACM Transactions on Graphics, vol. 32, Issue 6, Nov. 2013, 11 pages.

Kim, et al., "Digits: Freehand 3D Interactions Anywhere Using a WristWorn Gloveless Sensor", In Proceedings of the 25th annual ACM symposium on User interface software and technology, Oct. 7, 2012, 11 pages.

Oikonomidis, et al., "Efficient Model-Based 3d Tracking of Hand Articulations Using Kinect", In Proceedings of 22nd British Machine Vision Conference, Aug. 29, 2011, 11 pages.

Duong, et al., "Interactive Full-Body Motion Capture Using Infrared Sensor Network", In International Journal of Computer Graphics & Animation, vol. 3, No. 4, Oct. 2013, pp. 41-56.

Tompson, et al., "Real-Time Continuous Pose Recovery of Human Hands Using Convolutional Networks", In Journal of ACM Transactions on Graphics, vol. 33, Issue 5, Aug. 2014, 10 pages.

Mo et al., "Real-time Hand Pose Recognition Using Low-Resolution Depth Images", In IEEE Computer Society Conference on Computer vision and Pattern Recognition, vol. 2, Jun. 17, 2006, 7 pages.

Mori, Greg., "Guiding Model Search Using Segmentation", In Tenth IEEE International Conference on Computer Vision, vol. 2, Oct. 17, 2005, 7 pages.

Ingulkar, et al., "Hand Data Glove: A Wearable Real Time Device for Human Computer Interaction", In International Journal of Science and Engineering, vol. 1, No. 2, Oct. 30, 2014, 6 pages.

Saxena, A. et al., "3-D Depth Reconstruction from a Single Still Image", In International Journal of Computer Vision, vol. 76, Issue 1, Published online Aug. 16, 2007, 17 pages.

Shotton, J. et al., "Real-Time Human Pose Recognition in Parts from Single Depth Images", In Communications of the ACM, vol. 56, Issue 1, Jan. 1, 2013, Original version of paper appeared in the Proceedings of the 2011 Conference on Computer Vision and Pattern Recognition (CVPR), Jun. 20, 2011, 9 pages.

ISA European Patent Office, International Search Report and Written Opinion issued in PCT Application No. PCT/US2016/024596, Jun. 1, 2016, WIPO, 12 pages.

Nagai, T. et al., "HMM-Based Surface Reconstruction From Single Images", In Proceedings of International Conference on Image Processing, Sep. 22, 2002, Rochester, New York, 4 pages.

Saxena, A. et al., "Learning Depth from Single Monocular Images", In Proceedings of Advances in Neural Information Processing Systems 18: Conference on Neural Information Processing Systems, Dec. 5, 2005, Vancouver, British Columbia, Canada, 8 pages.

IPEA European Patent Office, Second Written Opinion Issued in PCT Application No. PCT/US2016/024596, Mar. 2, 2017, WIPO, 5 pages.

* cited by examiner

TWO-DIMENSIONAL INFRARED DEPTH SENSING

BACKGROUND

A variety of imaging devices produce three-dimensional images. A depth camera, for example, may employ time-of-flight, structured light, or stereo camera configurations to facilitate three-dimensional imaging.

SUMMARY

Embodiments are disclosed that relate to depth sensing based on infrared imaging. In one example, a signal encoding an infrared (IR) image including a plurality of IR pixels is received from an IR camera. Each IR pixel specifies one or more IR parameters of that IR pixel. IR-skin pixels that image a human hand are identified in the IR image. For each IR-skin pixel, a depth of a human hand portion imaged by that IR-skin pixel is estimated based on the IR parameters of that IR-skin pixel. A skeletal hand model including a plurality of hand joints is derived. Each hand joint is defined with three independent position coordinates inferred from the estimated depths of each human hand portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A variety of imaging devices operable to produce three-dimensional images exist. A depth camera, for example, may employ time-flight (TOF), structured light, and/or stereo camera approaches to three-dimensionally image a scene. Such depth cameras, however, are often expensive and consume considerable computational resources and power, which can render their use unsuitable for certain contexts—e.g., in portable devices such as laptops, tablets, and smartphones. As discussed below, a two-dimensional (2D) infrared (IR) camera operable to generate 2D IR images can be used, in combination with predetermined knowledge of IR reflection phenomena, to estimate depth without the expense and/or power requirements of a true 3D camera (e.g., time-of-flight, structured light, stereo, etc.). In one example, the 2D IR camera may be used to derive a skeletal hand model based on estimated depths.

Figure 1:
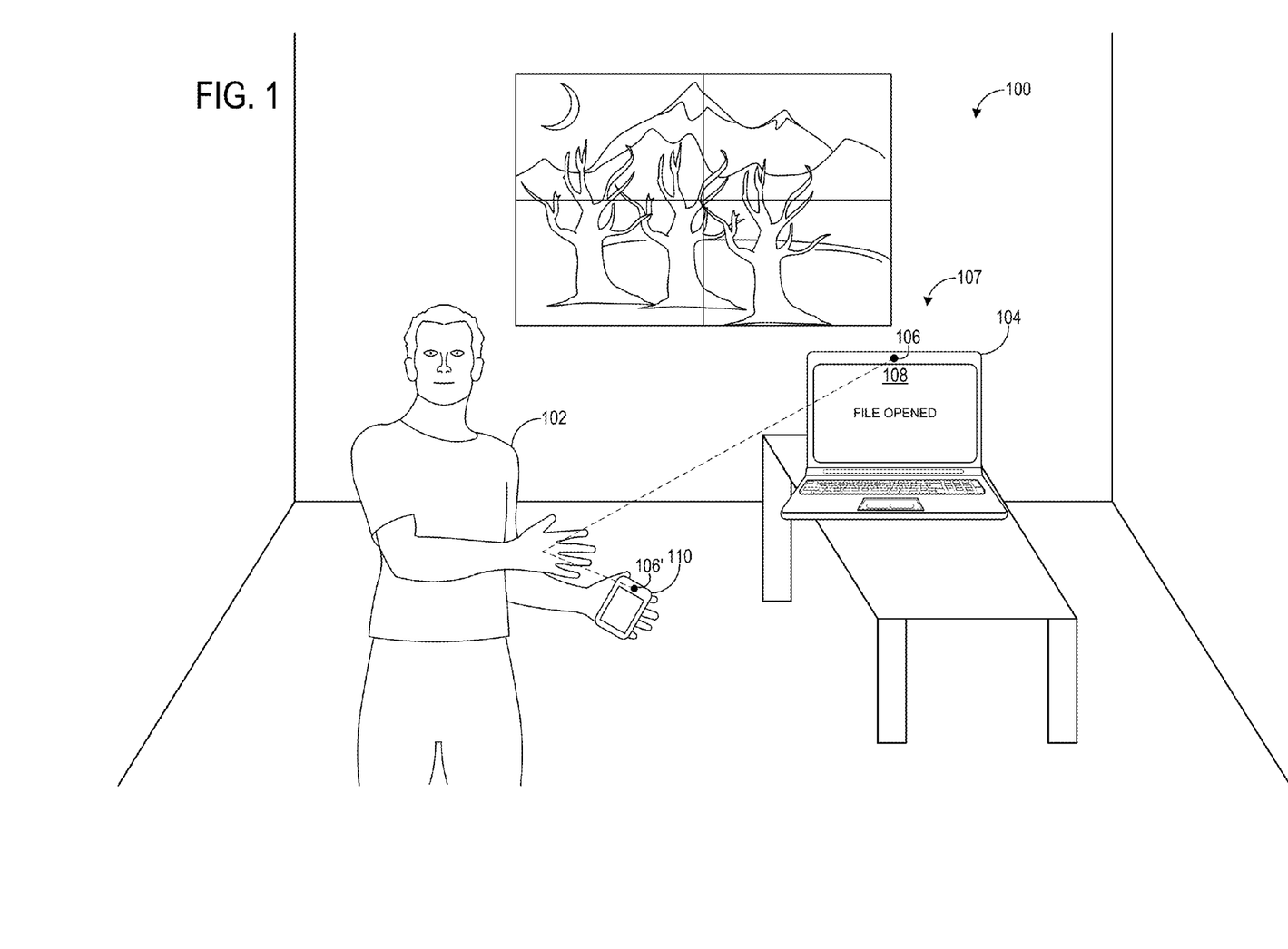
FIG. 1 shows an example environment in which a user interacts with one or more computing devices via hand gestures.

FIG. 1 shows an example environment 100 in which a user 102 can interact with one or more computing devices via hand gestures. In particular, user 102 is shown as interacting with a computing device 104, depicted in FIG. 1 as a laptop computing device. To facilitate detection of hand gestures performed by user 102, computing device 104 includes an infrared (IR) camera 106. Computing device 104 and IR camera 106 together constitute a machine-vision system 107 that may be used to interpret the hand gestures performed by user 102.

While IR camera 106 is not a conventional 3D camera, IR camera 106 may be used to estimate depth—defined as a coordinate (e.g., Cartesian z) parallel to the optical axis of the IR camera—and thus estimate the three-dimensional shapes of objects such as the hands of user 102. As such, three-dimensional gestures performed by one or both of the hands of user 102 and sensed by IR camera 106 may be interpreted to affect various aspects of computing device 104. As shown in FIG. 1, gestural input supplied by the hand of user 102 is interpreted to affect aspects of an operating system (e.g., causing opening of a file) running on computing device 104, which is indicated to the user via a display 108 (e.g., with a caption "FILE OPENED"). It will be understood, however, that virtually any controllable aspect of an operating system, application, or other computing product may be controlled by movements of a human user.

It will be appreciated that computing device 104 may receive other types of natural user input (NUI) in addition to hand gestures. For example, computing device 104 may interpret speech and/or eye movements expressed by user 102. Moreover, computing device 104 may interpret gestures performed by body parts of user 102 other than the hands, and in some examples, may be configured to receive input via so-called conventional input devices (e.g., keyboard, touch-screen, mouse, game-system controller, wireless remote). Further, IR camera 106 may be used to image non-human subjects, including inanimate objects—e.g., those held by user 102.

IR camera 106 may three-dimensionally image a surface in environment 100 by projecting IR or near-IR (NIR) light onto the surface and measuring the intensity of the projected light reflected by the surface. Such projection of light into environment 100 may enable the generation of two-dimensional (2D) IR images that comprise a plurality of IR pixels each specifying an intensity of IR light reflected by a surface imaged by that pixel. As such, IR camera 106 may be referred to as a 2D IR camera. The IR intensity of that pixel may be combined with predetermined knowledge of IR reflection phenomena to infer the depth of the surface imaged by that pixel. As described in further detail below, such predetermined knowledge may include a predetermined inverse square relationship between depth and IR intensity.

IR camera 106 may thus enable depth sensing based on 2D IR images, without measuring temporal modulation of projected IR light as in a time-of-flight (TOF) depth camera, spatial modulation of projected IR light as in a structured light depth camera, or parallax as in a stereo depth camera. In contrast to TOF and structured light depth cameras, IR camera 106 may illuminate a scene with a substantially uniform (temporal and spatial) lighting. Unlike stereo depth cameras, a single objective lens system and image sensing array may be used. As such, IR camera 106 may enable three-dimensional depth sensing at reduced financial cost, computational cost, power consumption, and/or packaging space, relative to three-dimensional depth cameras. Accordingly, IR camera 106 may be suitable for use in small form-factor and/or portable computing devices such as computing device 104. As another example of such a computing device, FIG. 1 shows the incorporation of a second IR camera 106' in a mobile computing device 110, depicted as a smartphone in this example. It will be appreciated, however, that computing devices 104 and 110 are provided as non-limiting examples, and that an IR camera may be utilized in other manners—e.g., the IR camera may be employed in a peripheral device such as a webcam communicatively coupled to, and housed outside of, a computing device, a wearable computing device such as a head-mounted display, etc.

Figure 2:
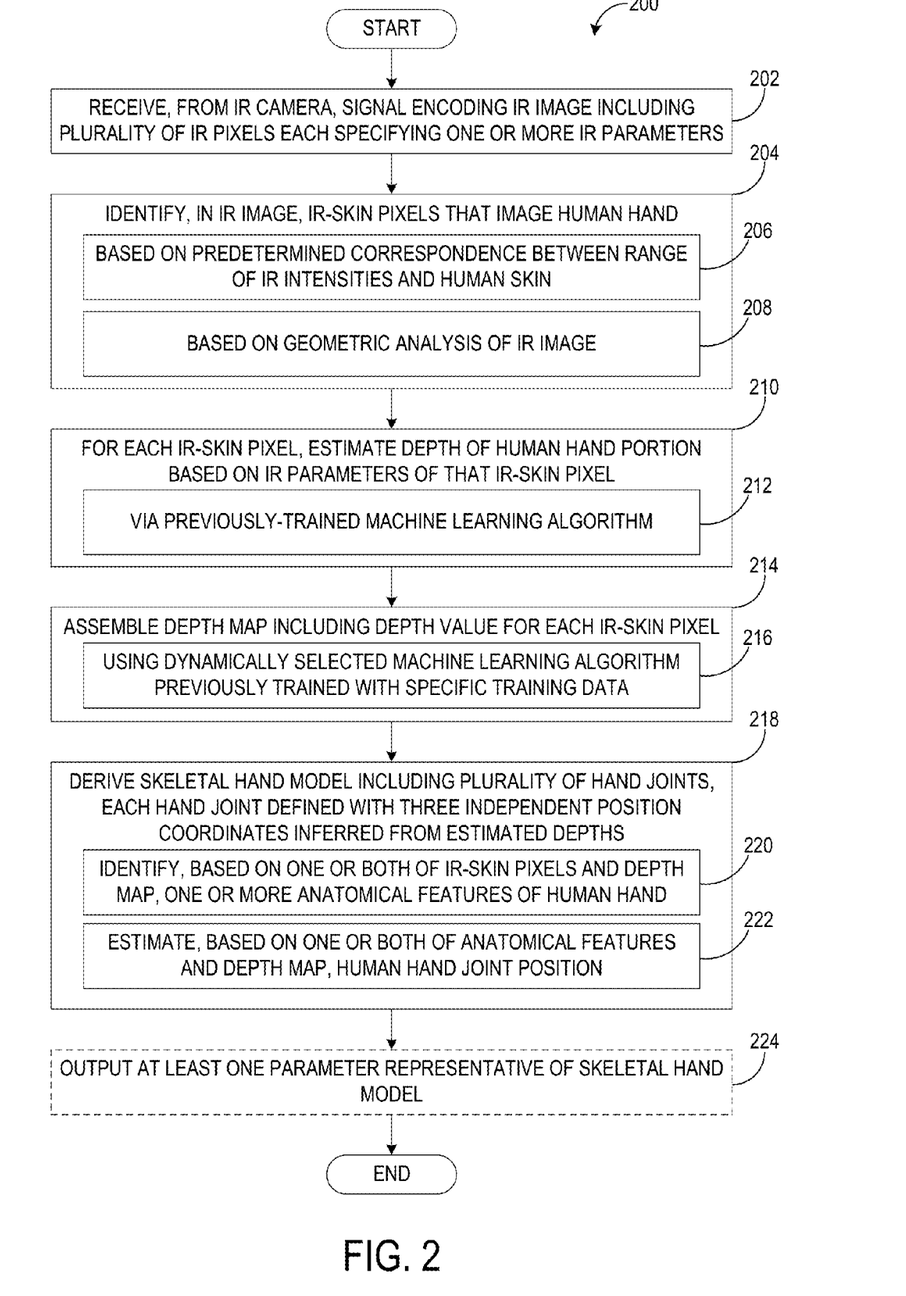
FIG. 2 shows a flowchart illustrating a method of deriving a skeletal hand model based on depth estimated via an IR camera.

FIG. 2 shows a flowchart illustrating a method 200 of deriving a skeletal hand model based on depth estimated via an IR camera. With reference to FIG. 1, method 200 may be performed by an image-processing computing device such as computing devices 104 and/or 110, using 2D IR images obtained by IR cameras 106 and/or 106', for example.

At 202 of method 200, a signal encoding an IR image is received from the IR camera, the IR image including a plurality of IR pixels each specifying one or more IR parameters. In some implementations, the IR image may be received via a hardware and/or software IR camera interface (e.g., Universal Serial Bus). The IR image may be communicated via wired or wireless communication channels.

Figure 3:
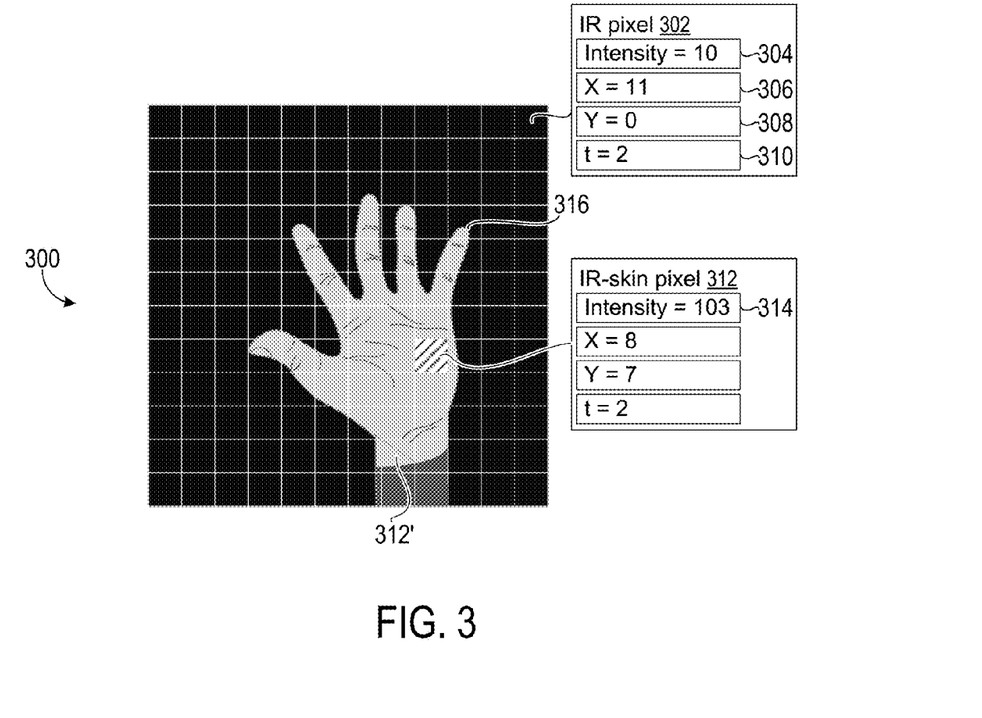
FIG. 3 schematically shows an example IR image.

Turning now to FIG. 3, an example IR image 300 is shown. IR image 300 includes a plurality of IR pixels (e.g., IR pixel 302). Each IR pixel specifies one or more IR parameters of that IR pixel. In the example depicted in FIG. 3, IR pixel 302 specifies an IR intensity 304 of that pixel, which may represent the so-called "IR response" of a surface imaged by that pixel to impinging IR light. IR pixel 302 may specify additional IR parameters, including but not limited to an x-coordinate 306 and a y-coordinate 308, which cooperate to identify the spatial location of the IR pixel in IR image 300, and/or a temporal identifier 310 that identifies the temporal location of the IR pixel. Temporal identifier 310 may provide an absolute indication of the temporal location of the IR pixel (e.g., in the form of a timestamp) or a relative indication of its temporal location in a sequence of IR images (e.g., in the form of a frame number), for example.

Returning to FIG. 2, at 204 of method 200, IR-skin pixels that image a human hand are identified in the IR image. As shown in FIG. 3, IR image 300 images a human hand (e.g., of user 102 of FIG. 1), and as such includes at least one IR-skin pixel—that is, an IR pixel that images human skin. IR-skin pixel 312 is one example of an IR pixel that images human skin, and may be identified as such—and distinguished from non-skin IR pixels—based on a predetermined correspondence between a range of IR intensities and human skin. As such, identification of the IR-skin pixels at 204 may include, at 206, identifying the IR-skin pixels based on the predetermined correspondence between the range of IR intensities and human skin. Here, the one or more IR parameters specified by IR-skin pixel 312—in particular IR intensity 314—are used to identify this pixel as an IR-skin pixel.

A correspondence between a range of IR intensities and human skin may be determined via a trained machine learning algorithm (MLA). Training of the MLA may include capturing IR images of human subjects and recording the IR intensities of IR-skin pixels that image skin of the human subjects at known distances and/or lighting conditions. The IR-skin pixels may be identified, and distinguished from non-skin IR pixels, via manual annotation and/or an automated process utilizing other body part recognition techniques, for example. A range of IR intensities that correspond to human skin may then be assembled and used to assess IR intensities to identify unknown pixels during runtime.

It will be appreciated that the correspondence between IR intensity and human skin may be learned on a more granular level such that individual skin tones can be identified based on the IR intensity specified by IR-skin pixels. In such a configuration, the IR response of the skin of a variety of human subjects is measured. The variety of human subjects may be selected to adequately represent the gamut of human skin tones. The measured IR responses may then be sorted into a plurality of subranges each corresponding to a different skin tone. The plurality of subranges may be subranges of the overall range of IR intensities corresponding to human skin, for example.

The range of IR intensities optionally may be determined and/or adjusted in realtime—for example, a recognizer configured to recognize a particular anatomical feature (e.g., face) of a human subject may be used to identify pixels corresponding to the anatomical feature. The IR intensities of such pixels may then be used to assemble and/or influence the range of IR intensities corresponding to human skin. In either case, the IR skin tone of human skin may be used to identify IR-skin pixels in an IR image.

The range of IR intensities that correspond to human skin may be used to identify non-skin IR pixels—that is, IR pixels that do not image human skin. In the example depicted in FIG. 3, IR pixel 302 is identified as a non-skin IR pixel by comparing its IR intensity 304 to the range of IR intensities. In this example, IR intensity 304 falls outside of the range of IR intensities, causing pixel 302 to be identified as a non-skin IR pixel. Non-skin IR pixel 302 may correspond to the clothing of the human subject imaged by IR image 300, a background surface, etc.

A thresholding process may alternatively or additionally be applied to IR image 300 to identify IR-skin pixels therein. The thresholding process may include comparing the IR intensity of each IR pixel in IR image 300 to a threshold intensity to classify that IR pixel as either a background pixel or a foreground pixel. Subsequent analysis may then be prioritized for, or restricted to, the foreground pixels, as the foreground pixels are more likely to correspond to surfaces of interest—e.g., hands of a human subject—by virtue of these surfaces tending to be closer to the IR camera in typical use scenarios. The threshold intensity may be predetermined (e.g., based on an assessment of the average difference between IR intensities of surfaces proximate to an IR camera and background surfaces in typical use environments), or in other examples may be determined for IR image 300 based on the IR intensities specified by its plurality of IR pixels (e.g., via statistical analysis). Similarly, IR pixels specifying the brightest range of IR intensities in IR image 300 may be, at least initially, considered the likeliest IR-skin pixel candidates due to the tendency of skin to be the closest surface to an IR camera in typical use scenarios.

Other techniques may be employed alternatively or in addition for identifying IR-skin pixels in IR image 300. For example, IR image 300 may be analyzed for geometric features that correspond to human body shapes. As such, identification of the IR-skin pixels at 204 may include, at 208, identifying the IR-skin pixels based on geometric analysis of IR image 300. In the case that capture of human hands in IR image 300 is expected, the IR image may be specifically analyzed for geometric features that correspond to human hands. Geometric analysis may include edge detection, in which boundaries separating regions of significantly different IR intensity are identified. In IR image 300, edge detection identifies a boundary 316 that separates a region of IR intensities that correspond to human skin (e.g., of a hand) from a region of IR intensities that do not correspond to human skin (e.g., background pixels, pixels corresponding to clothing). Edge detection may thus enable at least gross detection of human body shapes such as hands.

Geometric analysis may alternatively or additionally include shape recognition, in which contiguous or near-contiguous regions of similar IR intensity are identified. Various suitable ranges of IR intensity may be considered similar; in some examples, a range may be selected so that IR intensities that differ due to varying depth yet belong to the same shape are considered similar. It will be appreciated that one or more of the approaches described above for identifying IR-skin pixels in IR image 300 may be used in conjunction with one another in various suitable orders—for example, geometric analysis may be first performed on the IR image followed by comparison of the IR intensities to the predetermined range of IR intensities known to correspond to human skin, while in other examples the IR intensity comparison may be first performed followed by geometric analysis. In any case, analysis of IR image 300 may yield a "segmented hand"—e.g., a plurality of IR-skin pixels identified as corresponding to a human hand and distinguished from IR-skin pixels that do not image the human hand.

Returning to FIG. 2, at 210 of method 200, for each IR-skin pixel, a depth of a human hand portion imaged by that IR-skin pixel is estimated based on the IR parameters of that IR-skin pixel. Estimation of the depth of each IR-skin pixel may utilize knowledge of IR reflection phenomena—namely, the inverse square root proportionality of depth to IR intensity (e.g., depth $\propto$ sqrt(1/intensity)). Thus, relatively higher IR intensities specified in the IR image may generally be interpreted as an indication of relatively shallower depth (e.g., closer to the IR camera and/or source of IR light), while relatively lower IR intensities may generally be interpreted as an indication of relatively greater depth.

A relative and/or absolute depth may be estimated for each IR-skin pixel. As one non-limiting example, an average depth of a segmented hand may be estimated by analyzing the entirety of an IR image of the segmented hand, with relative depths being subsequently assigned to each IR-skin pixel of the IR image.

Estimating, for each IR-skin pixel, the depth of the human hand portion imaged by that IR-skin pixel, may include, at 212, estimating the depth via a previously-trained machine learning algorithm (MLA).

The MLA may be trained to map a corresponding depth to a given IR intensity in various suitable manners. In one example, the MLA may be trained with 2D IR images and three-dimensional (3D) depth maps annotated with ground truths. The ground truths provide verified depths that can be matched with corresponding pixels in the IR images so that the MLA can be trained to map depth to IR intensity for particular skin tones and/or lighting conditions.

Figure 4:
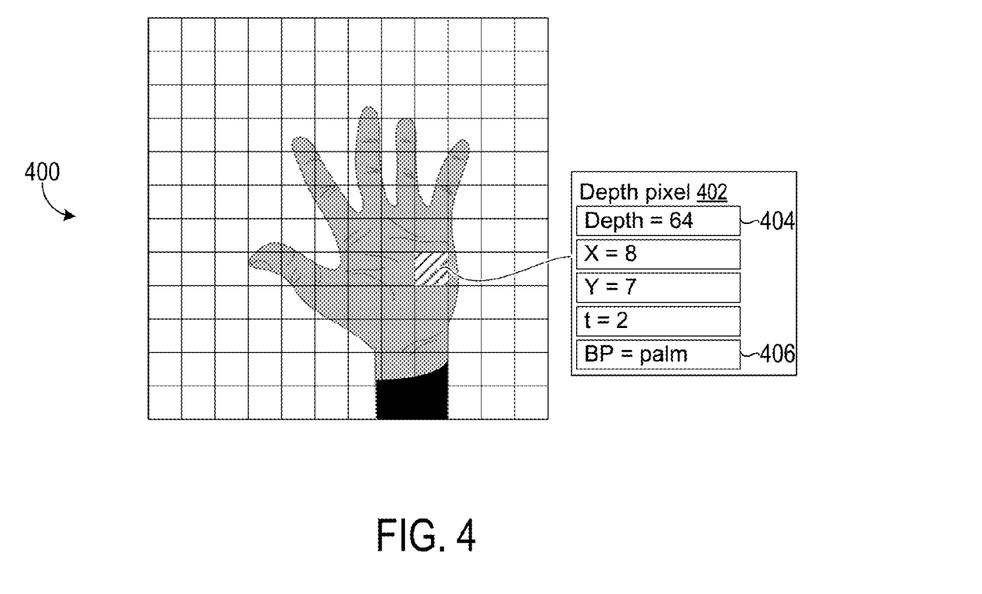
FIG. 4 schematically shows a visual representation of an example depth map.

Turning briefly to FIG. 4, an example depth map 400 is shown. In the depicted example, depth map 400 images the same human hand captured in IR image 300 (FIG. 3), and includes a depth for each IR-skin pixel identified in the IR image—for example, a depth pixel 402 of the depth map, which corresponds spatially and temporally to IR-skin pixel 312 of the IR image, specifies a depth 404 of that IR-skin pixel. Depth map 400 may be assembled in various suitable manners—for example, the depth map may be derived from IR image 300. In this example, depth 404 may be determined for IR-skin pixel 312 based on the one or more IR parameters specified by that IR-skin pixel—as an example, the IR intensity 314 specified by that pixel.

In one exemplary training process, the 2D IR images and 3D depth maps with which the MLA is trained are respectively obtained from an IR camera and a 3D depth camera. The depth camera is operable to produce 3D depth maps having absolute depths that can be associated with the IR intensities of corresponding pixels of the 2D IR images. The association of absolute depth with IR intensity may be carried out manually with human supervision, automatically, or a combination thereof. In some examples, the association may be substantially automated by co-registering corresponding pairs of 2D IR images and 3D depth maps. Referring to FIG. 3, IR image 300 may be temporally registered to a corresponding depth map (e.g., depth map 400 of FIG. 4) by matching temporal identifier 310 to a time-corresponding temporal identifier of the corresponding depth map, and/or pixels of the IR image may be spatially registered to corresponding pixels of the corresponding depth map by respectively matching x-coordinate 306 and y-coordinate 308 to those of the corresponding depth map. It will be appreciated, however, that differences between the capture of 2D IR images and 3D depth maps may be accounted for in the co-registration process, for example by applying a spatial transform to one or both of the IR images and depth maps and/or identifying, and excluding from subsequent analysis, regions where only one of IR and depth data was collected (e.g., due to occlusion or different fields of view).

Each corresponding IR image/depth map pair may be captured at substantially the same time and substantially from the same vantage point. In one example, a 3D depth camera enables capture of both 3D depth maps and 2D IR images in a common housing with corresponding depth map/IR image pairs being spatially and temporally co-registered. In other examples, the 3D depth camera and 2D IR camera are separately housed. In either case, various suitable depth camera types may be employed, including but not limited to time-of-flight (TOF), structured light, and stereo depth cameras. Variations in the respective vantage points may be corrected by a mathematical transformation and/or corresponding pixels can be identified manually.

Training of the MLA may alternatively or additionally include simulating ambient lighting conditions in typical use environments, which may include considerations of the number of light sources, light source placement, light source intensity, etc. In this way, the robustness and invariance of the MLA to varying lighting conditions may be increased. Other factors that can affect the robustness and invariance of the MLA may be accounted for during the training process, such as anatomical features specific to human hands (e.g., skin colors, skin textures). It will be appreciated that the thresholding process described herein may be employed during the MLA training process—for example, IR intensities and/or depths may be thresholded to reduce computational load and focus learning on surfaces of interest.

Alternatively or in addition to capturing 2D IR images and 3D depth maps with physical camera(s), synthetic (e.g., computer-rendered) 2D IR images and/or 3D depth maps may be synthesized and used to train the MLA. Such synthetic training data may help provide a large training set and may significantly increase the robustness and invariance of the MLA by adding variety to the training data—e.g., the synthetic data may simulate a variety of lighting conditions, surfaces, etc. The 2D IR images used to train the MLA may thus include synthetic IR images generated to simulate reflection of IR light by human skin, and the 3D depth maps used to train the MLA may, alternatively or in addition, include synthetic depth maps generated to enable association of depths specified by the synthetic depth maps with corresponding IR intensities (e.g., corresponding IR intensities specified by real and/or synthetic IR images). As such, synthesis of the synthetic depth maps may include synthesis of 3D models—particularly, 3D models of objects for which tracking based on the training data is intended. A 3D model of a human hand may be generated for scenarios in which hand tracking is desired, for example. Generally, the MLA training process may be restricted to the objects for which tracking with the MLA is desired. As described in further detail below, training data used by the MLA may be dynamically selected during tracking.

In some examples, the MLA may be implemented with random decision forests. Once trained, the forests may be applied to an IR image to estimate depths therein. A random decision forest may include one or more random decision trees that provide a data structure with which training data may be stored such that IR pixels may be sent through a tree and their one or more IR parameters and/or other classification inputs algorithmically compared against the stored training data to estimate depth. Each tree may comprise at least one root node, split node, and leaf node, where decisions may be made at the root and split nodes (e.g., comparison of IR pixels to stored training data), and data resulting from the decisions may be stored at the leaf node. The structure (e.g., node number, node relationships, split node functions/decisions) of a tree may be learned during the MLA training process.

In an exemplary training process of a random decision tree, at least one IR pixel and at least one depth, respectively specified by an IR image and depth map (e.g., co-registered to each other), may be used as input to respective binary tests performed at each root and split node. Based on the results of a binary test, the input is directed to a child node in either a left or right direction. As a non-limiting example, a binary test may compare the input to one or more thresholds (e.g., an upper and/or lower threshold). In some examples, a binary test may evaluate the IR intensity specified by two or more IR pixels—e.g., two IR pixels randomly displaced from each other. FIG. 3 shows an example of evaluating the IR intensities of spatially offset IR pixels; as shown therein, IR-skin pixel 312 and IR-skin pixel 312', randomly offset from pixel 312, are selected for the binary test. The difference between the respective IR intensities of pixels 312 and 312' may be computed and compared against one or more thresholds, for example. The magnitude and/or direction offset may be randomly selected. In some implementations, a binary test may be selected based on an approximate depth map assembled without random decision trees where a depth for an IR pixel of an IR image is estimated based on the inverse square root relationship between its specified IR intensity and depth.

In some examples, a multi-layered random decision forest may be utilized for estimating depth from IR intensity. The multi-layered forest may comprise a first layer having a classifier forest trained to generally classify objects captured in an IR image, and a second layer having a regression forest trained to specifically recognize the generally classified aspects of the captured objects at a more granular level. As a non-limiting example in the context of hand tracking, the classifier forest may be used to initially recognize a pose (e.g., thumbs up, pointing, fist, pinching, peace sign) of a human hand captured in an IR image; once this pose is initially recognized, a regression forest trained for that specific pose may be selected and used to determine depths associated with the imaged hand. Such a configuration may broaden the areas in which tracking is generally applicable while providing accurate depth estimation for specific objects, poses, etc.

Depth may be another criterion on which the selection of regression forests is based. In this example, a classifier forest may output statistics classifying an IR pixel as having a depth falling in one of a plurality of depth ranges. A different regression forest may be associated with each depth range, such that a regression forest may be selected for the specific range in which the depth of the classified IR pixel falls.

In the multi-layered random decision forest example, leaf nodes of a classifier forest may store, for a given input (e.g., IR pixel, IR pixel and corresponding depth value) fed to the classifier forest, statistics regarding the input obtained via execution of the tests at the root and split nodes—for example, a probability distribution indicating the probability of the classified depth falling in each of a plurality of depth ranges. As described above, the probability distributions may be used to select a regression forest, which may store at its leaf nodes, for a given input, an estimated depth of that input. It will be appreciated that, in some examples, depths estimated by two or more regression forests for the same input may be analyzed to determine a final estimated depth for that input—e.g., via a weighted average of the individual depths.

Continuing with FIG. 2, at 214, method 200 includes assembling a depth map including a depth for each IR-skin pixel. The depth map may include a depth for each IR-skin pixel identified in the IR image—e.g., depth map 400 of FIG. 4 includes a depth 404 for IR-skin pixel 312 of IR image 300 of FIG. 3. In some examples, assembling the depth map may include deriving the depth map from the IR image.

Assembling the depth map may include, at 216, using a dynamically selected machine learning algorithm (MLA) previously trained with specific training data. As described above, some implementations of a hand tracking pipeline may employ a multi-layer approach in which output from a first layer trained for general hand tracking is fed to a second layer trained to recognize a specific hand pose. The second layer may accordingly utilize training data obtained for a specific pose initially recognized by the first layer. Such a configuration may enable tracking of a wide variety of hand poses and accurate recognition of specific poses that general hand tracking may be unsuitable for.

The initial recognition of hand pose may occur at various stages in a hand tracking pipeline. For example, a hand pose recognized in a previous-frame depth map (e.g., a depth map assembled prior to the instant depth map undergoing analysis) may form the basis of the initial recognition of the instant hand pose. The initial recognition may utilize alternative or additional data, including but not limited to a segmented hand (e.g., one or more IR-skin pixels), depth map, one or more identified anatomical features of the hand (described below), an estimated hand joint position, etc. Thus, in some scenarios, dynamic selection of the MLA may entail switching from a first MLA used for general hand tracking in the first layer to a second MLA used for specific hand pose recognition in the second layer. As a non-limiting example, hand tracking may recognize, via the first layer, that a human hand is in a pointing pose where one of the fingers of the hand is pointing substantially directly toward an IR camera—e.g., the longitudinal axis of the finger is substantially aligned with the optical axis of the IR camera. Upon recognition of this pose, a MLA specific to the recognized pose may be employed in the second layer to estimate depths associated with the pose and derive a skeletal hand model based on the pose.

Continuing with FIG. 2, at 218 of method 200, a skeletal hand model including a plurality of hand joints is derived, each hand joint defined with three independent position coordinates inferred from the estimated depths of each human hand portion.

Figure 5:
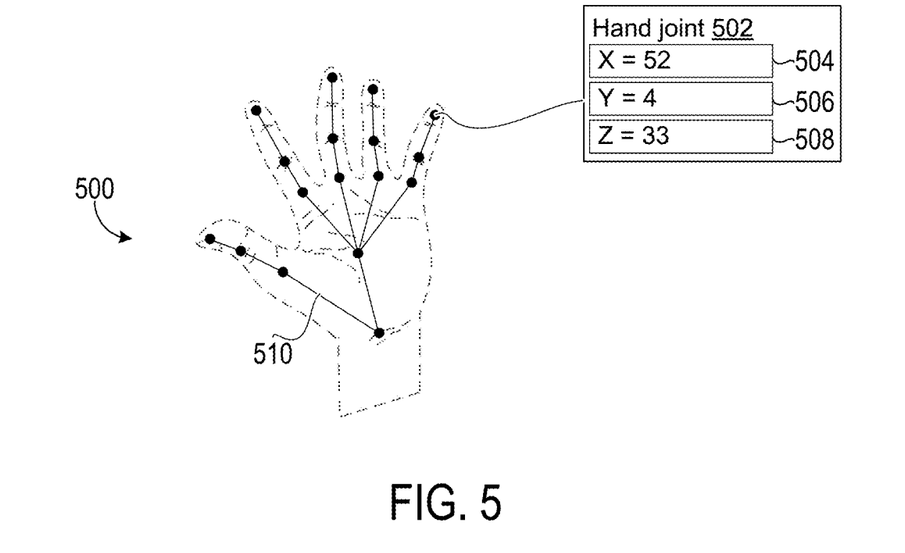
FIG. 5 schematically shows a visual representation of an example skeletal hand model.

FIG. 5 schematically shows a visual representation of an example skeletal hand model 500. Hand model 500 serves as a machine-readable representation of a hand of a human subject—e.g., the hand imaged in IR image 300 (FIG. 3). In some implementations, the hand model may take the form of a 3D matrix, with each row of the matrix representing a different joint, and each column of the matrix representing a different coordinate (e.g., Cartesian x, y, z).

Hand model 500 includes a plurality of hand joints such as hand joint 502. The hand joints in hand model 500 may correspond to actual joints of a human subject, centroids of the human subject's body parts, terminal ends of a human subject's extremities, and/or points without a direct anatomical link to the human subject. One or more of the hand joints of hand model 500 may be defined with three independent position coordinates—e.g., hand joint 502 is defined with an x-coordinate 504, a y-coordinate 506, and a z-coordinate 508. x, y, and z coordinates 504, 506, and 508 are independent from one another (e.g., they form an orthonormal basis). As such, x, y, and z coordinates 504, 506, and 508 may be computed independently from one another—for example, a position of hand joint 502 may be estimated, including estimating x-coordinate 504 based at least in part on x-coordinates specified by one or more IR-skin pixels spatially corresponding to the hand joint, estimating y-coordinate 506 based at least in part on y-coordinates specified by one or more IR-skin pixels spatially corresponding to the hand joint, and estimating z-coordinate 508 based at least in part on the depths estimated from one or more IR-skin pixels spatially corresponding to the hand joint.

The position of the joints of hand model 500 may be defined relative to any suitable origin. As one example, a camera (e.g., IR camera 106 of FIG. 1) may serve as the origin, with all joint positions being defined relative to the camera. Joints may be defined with a three-dimensional position in any suitable manner without departing from the scope of this disclosure.

A joint orientation may be used to further define one or more of the hand joints. Whereas joint positions may describe the position of joints and virtual bones (e.g., virtual bone 510) that span between joints, joint orientations may describe the orientation of such joints and virtual bones at their respective positions. As an example, the orientation of a palm joint may be used to describe if a hand located at a given position is facing up or down.

Virtual bones may extend from one hand joint to another and may correspond to actual bones, limbs, or portions of bones and/or limbs of a human subject. The joint orientations discussed herein may be applied to these bones. For example, an elbow orientation may be used to define a forearm orientation.

Via any suitable optimization approach, the lengths of skeletal segments and the positions and rotational angles of joints in a skeletal hand model may be adjusted for agreement with the various contours of a depth map (e.g., depth map 400 of FIG. 4). This process may define the location and pose of an imaged human hand. Some hand-fitting algorithms may use the depth data in combination with other information, such as color-image data, IR data, and/or kinetic data indicating how one locus of pixels moves with respect to another.

Joint positions, orientations, and/or other information may be encoded in any suitable data structure(s). Furthermore, the position, orientation, and/or other parameters associated with any particular joint may be made available via one or more APIs.

Hand model 500 may be used for a variety of purposes. Because hand model 500 changes poses as the human hand it represents changes poses, the hand model accurately mimics the movements of the human hand. Thus, in some embodiments, a hand model may be fit to each of a sequence of frames of depth video (e.g., successive depth maps). By analyzing positional change in the various hand joints and/or segments, the corresponding movements—e.g., gestures, actions, or behavior patterns—of an imaged human hand may be determined, which may facilitate the interpretation of natural user input (NUI), for example. It is to be understood, however, that a hand model may be used for additional and/or alternative purposes without departing from the scope of this disclosure. For example, hand model 500 may be used to render a 3D representation of the hand it represents.

Continuing with FIG. 2, deriving the skeletal hand model may include, at, 220, identifying, based on one or both of the IR-skin pixels and the depth map, one or more anatomical features of the human hand. Various anatomical features of the human hand may be identified, such as contiguous or near-contiguous regions that each at least partially correspond to different parts of the hand—e.g., wrist, palm, and proximal phalanx, middle phalanx, and distal phalanx for each finger of the hand. FIG. 4 illustrates one example of anatomical feature identification: as shown therein, a palm of the hand is identified based on one or both of the IR-skin pixels identified in IR image 300 (FIG. 3) and depth map 400. In this example, identification of the palm includes classifying depth pixel 402 with a body part classifier 406 that classifies depth pixel 402 as identifying the palm. While shown in connection with depth map 400, it will be appreciated that the palm and its body part classifier 406, among other identified anatomical features, may or may not be associated with depth map 400—for example, in some examples a dedicated data structure may be provided for the identified anatomical features, or the identified anatomical features may be associated with one or more of an IR image, segmented hand, skeletal hand model, etc.

Returning to FIG. 2, deriving the skeletal hand model may include, at, 222, estimating, based on one or both of the anatomical features and the depth map, a position of a joint of the human hand. Here, the hand joint position may be estimated based on a single IR image and/or data derived therefrom (e.g., depth map, anatomical features), which may enable rapid estimation of the hand joint position. As described below, the accuracy of the estimated hand joint position may be increased via subsequent analysis.

In some implementations, deriving the skeletal hand model may include assigning a position of a corresponding hand joint of a previously-validated depth map to the hand joint position. The previously-validated depth map may be selected from a database of previously-validated depth maps each having a skeletal hand model including a plurality of hand joints. Each previously-validated depth map has been validated to accurately represent a human hand in a specific pose such that, by matching the (e.g., instant) depth map to a previously-validated depth map, an accurate skeletal hand model may be derived for the hand being imaged via the previously-validated depth map. Matching of the instant depth map to a previously-validated depth map may be carried out in various suitable manners; in one example, a hash may be computed for the instant depth map and a previously-validated depth map selected whose hash best corresponds to the computed hash of the instant depth map. As a non-limiting example illustrated by FIG. 5, the position of hand joint 502 may be derived by selecting a previously-validated depth map whose hash best corresponds to a hash computed for depth map 400 of FIG. 4, and assigning a position of a hand joint corresponding to hand joint 502 (of the skeletal model associated with the previously-validated depth map) to the position of hand joint 502. Assignment of the hand joint position may include assigning one or more of the x, y, and z coordinates of the hand joint of the previously-validated depth map skeletal hand model to x, y, and z coordinates 504, 506, and 508, respectively. However, as described in further detail below, additional analysis may be performed in some implementations following hand joint position assignment from a skeletal hand model of a previously-validated depth map.

Deriving the skeletal hand model may alternatively or additionally include applying a previously-trained machine learning algorithm (MLA) to one or both of the (e.g., instant) depth map and the estimated hand joint position. The previously-trained MLA may have been trained with training data including a training set of 2D IR image(s) and ground truth annotations of the training set of 2D IR image(s). The ground truth annotations may indicate, for example, verified hand joint positions in 2D IR images that image a variety of human hand poses. The verified hand joint positions may have been associated with 2D IR images in a supervised training process, for example. In some examples, the previously-trained MLA receives as input at least one hand joint position estimated from a previous-frame depth map. In this example, an iterative approach may be employed in deriving a hand joint position.

Deriving the skeletal hand model may alternatively or additionally include assigning at least one hand joint position determined by the previously-trained MLA to the skeletal hand model. Turning briefly to FIG. 5, the previously-trained MLA may determine the three-dimensional position of hand joint 502 based on one or both of depth map 400 of FIG. 4 and or an estimated position of hand joint 502. This three-dimensional position determined by the MLA may then be assigned to hand joint 502.

In some examples, derivation of the skeletal hand model may be based on the estimated hand joint position and at least one hand joint position estimated from a previous-frame depth map, irrespective of whether an MLA is employed in the derivation of the skeletal hand model. As described above, use of a hand joint position from a previous-frame depth map enables an iterative approach to hand tracking that adapts to hand movement.

Deriving the skeletal hand model may alternatively or additionally include using at least one randomly perturbed hand joint position estimated from a previous-frame depth map. In some examples, an optimization algorithm may be applied to an estimated hand joint position (e.g., estimated from the instant depth map) and the at least one randomly perturbed hand joint position estimated from a previous-frame depth map. Here, the optimization algorithm may be applied in an attempt to match an existing skeletal hand model to observed data. Various suitable skeletal hand models may be used, such as one comprising a plurality of spheres (e.g., twenty-four). The use of simple geometric shapes such as spheres, primitives, etc. may reduce the computational cost of skeletal hand model fitting. Use of a mesh that more accurately resembles the three-dimensional geometry of a typical human hand is possible, however. Application of the optimization algorithm may include employing a suitable error function and randomly perturbing at least one hand joint position estimated from a previous-frame depth map so that the hand joint position does not become trapped in a local minimum. The at least one randomly perturbed hand joint position may be used to minimize the error function, which may be defined as a function of a spatial correspondence between the skeletal hand model and IR-skin pixels—e.g., as a function of distances between hand joint positions of the skeletal hand model and corresponding hand joint positions inferred from the IR-skin pixels. Various suitable optimization algorithms may be used, including but not limited to particle swarm optimization (PSO) and iterative closest point (ICP). In some examples, skeletal hand models used in the optimization process may comprise elements (e.g., spheres, primitives, joints) whose positions are not fixed but instead are dynamically adjusted in the optimization process to perform hand-fitting. Anatomical constraints of real, physical human hands may be imposed on such skeletal hand models, however.

Continuing with FIG. 2, at 224 of method 200, at least one parameter representative of the derived skeletal hand model may be optionally outputted. For example, one or more estimated hand joint positions may be outputted. In some examples, all of the hand joint positions of the skeletal hand model may be estimated and outputted such that a three-dimensional representation of the hand model may be rendered and outputted to a display device. Alternatively or additionally, the recognized pose of the human hand and/or progress of the recognized pose may be outputted. Relative or absolute positions, orientations, etc. may further be outputted. In general, virtually any quantity derived in the execution of method 200 may be outputted, including but not limited to the IR image, depth map, segmented hand, anatomical features, estimated hand joint position, etc.

It will be appreciated that, in some examples, execution of method 200 may yield positions for a subset of the hand joints of the skeletal model, such that at least partial iteration of the method may be performed to obtain positions for all of the hand joints. In some scenarios, for example those in which skeletal hand models of previously-validated depth maps are employed, two or more hand joint positions may be obtained in one iteration of method 200.

Figure 6:
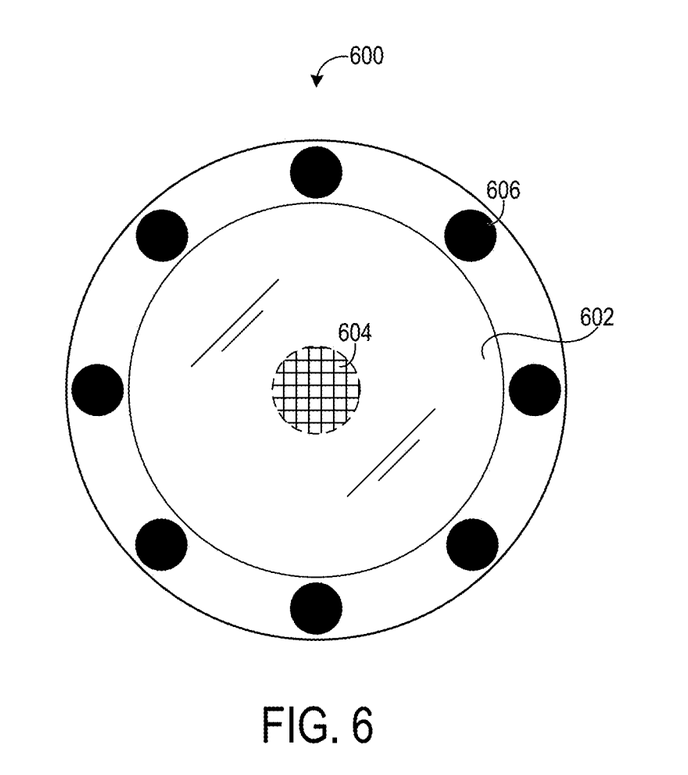
FIG. 6 shows an example IR camera operable to capture IR images of a scene.

FIG. 6 shows an example infrared (IR) camera 600 operable to capture IR images of a scene. Camera 600 may be used to obtain IR images of a human subject, for example, and may enable at least a portion of the approaches described herein for deriving a skeletal hand model based on IR imaging.

In the example depicted in FIG. 6, camera 600 includes an IR band pass filter 602 configured to transmit at least a portion of impinging IR light to an image sensor 604 positioned optically downstream the filter. Image sensor 604 is photoelectrically sensitive to at least a range of IR wavelengths (which may include near-infrared wavelengths), enabling transduction of IR light received thereon. Image sensor 604 may incorporate various suitable image sensing technologies, including a charge-coupled device (CCD) and/or a complementary metal-oxide-semiconductor (CMOS) sensor, for example.

Camera 600 further includes an IR illuminant configured to project (e.g., diffuse) IR light into a scene to enable the reception of reflected IR light from the scene. In this example, the IR illuminant includes eight IR LEDs (e.g., IR LED 606) positioned in an annular arrangement concentrically around filter 602. It will be appreciated, however, that this arrangement is non-limiting and that various suitable configurations may be employed for projecting IR light into a scene, including arrangements in which the IR illuminant is provided in a housing separate from that of camera 600. In some examples, the IR illuminant may be pulsed on only during capture periods of the image sensor to reduce power consumption. However, in general, the IR illuminant is not a structured light illuminant that projects a spatially varied pattern of light. The IR illuminant also is not a time-of-flight illuminant that varies illumination intensity during the image sensor's integration period so that the travel time of the light from the illuminant back to the sensor can be measured.

In some examples, camera 600 may be constructed as an IR camera. In other examples, camera 600 may be manufactured as a visible light camera (e.g., color camera) and converted to an IR camera. In this example, the conversion process may include removing an IR cut filter (if included), adding IR band pass filter 602, and adding the IR illuminant. In some scenarios, the conversion process may include replacing an image sensor if its sensitivity is unsuitable for sensing IR light.

Camera 600 is a two-dimensional, monocular IR camera configured to generate IR images having a plurality of IR pixels each specifying one or more IR parameters such as an IR intensity. Camera 600 may be used to generate IR image 300 of FIG. 3, for example. In this case, IR images generated by camera 600 may be fed to a suitable computing device (e.g., computing device 700 of FIG. 7) configured to estimate the depth of each IR pixel based on the IR intensity specified by that pixel, utilizing knowledge of IR reflection phenomena. The computing device may have a suitable IR camera interface (e.g., interface 712 of FIG. 7) for receiving a signal encoding an IR image, for example. Specifically, the computing device may utilize the inverse-square falloff of light to compute depth based on IR intensity; a function that maps the inverse square of IR intensity for a particular skin tone to depth may be used, for example. Thus, a relatively lower IR intensity may be mapped to a relatively greater depth, while a relatively greater IR intensity may be mapped to a relatively lesser depth. As described above, the relationship between depth and IR intensity may be used in combination with machine learning to estimate depth from IR. Use of a two-dimensional IR camera in this manner may facilitate depth determination at low cost and power consumption, especially relative to use of a three-dimensional depth camera.

While an IR camera is provided above as an example, it will be appreciated that the approaches described herein may be adapted for cameras configured to image subjects in wavelengths of light outside the IR portion of the electromagnetic spectrum. Such cameras may be used to estimate the depth of imaged surfaces and optionally derive skeletal hand models from estimated depth(s). Such cameras may include one or more of an illumination source, bandpass filter, and image sensor that are configured for image sensing in non-IR wavelengths. As with camera 600, such cameras may estimate depth based on knowledge of reflection phenomena of the wavelengths projected onto imaged surfaces, and not based on TOF, structured light, or stereo camera approaches employed by 3D depth cameras. As non-limiting examples, such non-IR cameras may be configured to perform image sensing in one or more of the ultraviolet (UV), visible, X-ray, gamma-ray, and radio portions of the electromagnetic spectrum. Regardless of their electromagnetic sensitivity, such cameras may encode an image including a plurality of pixels, each pixel specifying one or more parameters of that pixel. Then, skin pixels imaging a human hand may be identified in the image (e.g., based on knowledge of light reflection phenomena). For each skin pixel, a depth of a human hand portion imaged by that skin pixel may be estimated based on the parameters of that skin pixel. A skeletal hand model including a plurality of hand joints may be derived, each hand joint defined with three independent position coordinates inferred from the estimated depths of each human hand portion. Generally, the approaches described herein may be adapted for non-IR cameras, including the training processes described above.

Thus, in some examples, a camera may be selected from an infrared (IR) camera encoding an IR image including a plurality of IR pixels specifying one or more IR parameters, an ultraviolet (UV) camera encoding a UV image including a plurality of UV pixels specifying one or more UV parameters, and a visible light (VL) camera encoding a VL image including a plurality of VL pixels specifying one or more VL parameters.

Figure 7:
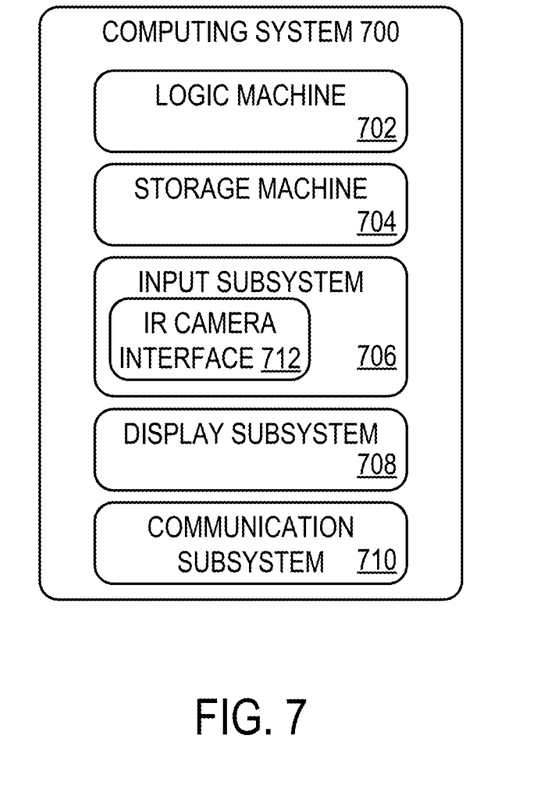
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Machine-vision system 107 of FIG. 1 is a non-limiting example of an implementation of computing system 700.

Computing system 700 includes a logic machine 702 and a storage machine 704. Computing system 700 may optionally include a display subsystem 708, input subsystem 706, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 708 may be used to present a visual representation of data held by storage machine 704. This visual representation may take the form of a graphical user interface (GUI). As the herein described methods and processes change the data held by the storage machine, and thus transform the state of the storage machine, the state of display subsystem 708 may likewise be transformed to visually represent changes in the underlying data. Display subsystem 708 may include one or more display devices utilizing virtually any type of technology. Such display devices may be combined with logic machine 702 and/or storage machine 704 in a shared enclosure, or such display devices may be peripheral display devices.

When included, input subsystem 706 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

In some examples, input subsystem 706 may include one or more hardware interfaces for receiving signals encoding images from one or more tracking devices. For example, input subsystem 706 may include an IR camera interface 712 configured to receive from an IR camera an IR image including a plurality of IR pixels. IR camera interface 712 may be configured to receive a signal from the IR camera encoding the IR image. The IR camera interface may incorporate various suitable interface technologies, including but not limited to wired and wireless interface technologies such as universal serial bus (USB), IEEE 1394, Bluetooth, Wi-Fi, etc.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

An example provides an image processing method comprising receiving, from an infrared (IR) camera, a signal encoding an IR image including a plurality of IR pixels, each IR pixel specifying one or more IR parameters of that IR pixel, identifying, in the IR image, IR-skin pixels that image a human hand, for each IR-skin pixel, estimating a depth of a human hand portion imaged by that IR-skin pixel based on the IR parameters of that IR-skin pixel, and deriving a skeletal hand model including a plurality of hand joints, each hand joint defined with three independent position coordinates inferred from the estimated depths of each human hand portion. In such an example, deriving the skeletal hand model alternatively or additionally includes assembling a depth map including a depth for each IR-skin pixel, and identifying, based on one or both of the IR-skin pixels and the depth map, one or more anatomical features of the human hand. In such an example, deriving the skeletal hand model alternatively or additionally includes estimating, based on one or both of the anatomical features and the depth map, a position of a joint of the human hand. In such an example, estimating the hand joint position alternatively or additionally includes computing a hash for the depth map, selecting a previously-validated depth map from a database of previously-validated depth maps whose hash best corresponds to the computed hash of the depth map, each previously-validated depth map having a skeletal hand model including a plurality of hand joints, and assigning a position of a hand joint from the hand model corresponding to the selected previously-validated depth map to the hand joint position. In such an example, deriving the skeletal hand model alternatively or additionally includes using at least one randomly perturbed hand joint position estimated from a previous-frame depth map to minimize an error function defined as a function of a spatial correspondence between the skeletal hand model and the IR-skin pixels. In such an example, deriving the skeletal hand model alternatively or additionally includes applying a previously-trained machine learning algorithm to one or both of the depth map and the estimated hand joint position, and assigning at least one hand joint position determined by the previously-trained machine learning algorithm to the skeletal hand model, the previously-trained machine learning algorithm trained with training data including a training set of two-dimensional IR images and ground truth annotations of the training set of two-dimensional IR images. In such an example, the previously-trained machine learning algorithm alternatively or additionally receives as input at least one hand joint position estimated from a previous-frame depth map. In such an example, for each IR-skin pixel, the depth of the human hand portion imaged by that IR-skin pixel is alternatively or additionally estimated via a previously-trained machine learning algorithm trained with two-dimensional (2D) IR images and three-dimensional (3D) depth maps annotated with ground truths. In such an example, the 2D IR images alternatively or additionally include synthetic IR images generated to simulate reflection of IR light by human skin, and/or the 3D depth maps include synthetic depth maps generated to enable association of depths specified by the synthetic depth maps with corresponding IR intensities specified by the synthetic IR images. In such an example, deriving the skeletal hand model alternatively or additionally includes assembling a depth map including a depth for each IR-skin pixel using a dynamically selected machine learning algorithm previously trained with training data specific to a recognized pose of the human hand. In such an example, the one or more IR parameters alternatively or additionally include an IR intensity. In such an example, the IR-skin pixels are alternatively or additionally identified based on a predetermined correspondence between a range of IR intensities and human skin. In such an example, the IR-skin pixels are alternatively or additionally identified based on geometric analysis of the IR image.

Another example provides a computing device comprising an infrared (IR) camera interface configured to receive, from an IR camera, an IR image including a plurality of IR pixels, each IR pixel specifying one or more IR parameters of that IR pixel, a logic machine, and a storage machine holding instructions executable by the logic machine to identify, in the IR image, IR-skin pixels that image a human hand, for each IR-skin pixel, estimate a depth of a human hand portion imaged by that IR-skin pixel based on the IR parameters of that IR-skin pixel, and derive a skeletal hand model including a plurality of hand joints, each hand joint defined with three independent position coordinates inferred from the estimated depths of each human hand portion. In such an example, the instructions to derive the skeletal hand model alternatively or additionally include instructions to assemble a depth map including a depth for each IR-skin pixel, and identify, based on one or both of the IR-skin pixels and the depth map, one or more anatomical features of the human hand. In such an example, the instructions to assemble the depth map alternatively or additionally include instructions to use a dynamically selected machine learning algorithm previously trained with training data specific to a recognized pose of the human hand. In such an example, the instructions to derive the skeletal hand model alternatively or additionally include instructions to estimate, based on one or both of the anatomical features and the depth map, a position of a joint of the human hand. In such an example, the instructions to derive the skeletal hand model alternatively or additionally include instructions to use at least one hand joint position estimated from a previous-frame depth map. In such an example, the one or more IR parameters alternatively or additionally include an IR intensity. In such an example, the instructions to identify the IR-skin pixels alternatively or additionally include instructions to identify the IR-skin pixels based on a predetermined correspondence between a range of IR intensities and human skin.

Another example provides an image processing method comprising receiving, from a camera, a signal encoding an image including a plurality of pixels, each pixel specifying one or more parameters of that pixel, identifying, in the image, skin pixels that image a human hand, for each skin pixel, estimating a depth of a human hand portion imaged by that skin pixel based on the parameters of that skin pixel, and deriving a skeletal hand model including a plurality of hand joints, each hand joint defined with three independent position coordinates inferred from the estimated depths of each human hand portion. In such an example, the camera is alternatively or additionally selected from the group consisting of an infrared (IR) camera encoding an IR image including a plurality of IR pixels specifying one or more IR parameters, an ultraviolet (UV) camera encoding a UV image including a plurality of UV pixels specifying one or more UV parameters, and a visible light (VL) camera encoding a VL image including a plurality of VL pixels specifying one or more VL parameters.

The invention claimed is:

1. An image processing method, comprising:
   receiving, from an infrared (IR) camera, a signal encoding an IR image including a plurality of IR pixels, each IR pixel specifying IR intensity of that IR pixel;
   identifying, in the IR image, IR-skin pixels that image a human hand;
   for each IR-skin pixel, estimating a depth of a human hand portion imaged by that IR-skin pixel based on the IR intensity of that IR-skin pixel; and
   deriving a skeletal hand model including a plurality of hand joints, each hand joint defined with three independent position coordinates inferred from the estimated depths of each human hand portion.

2. The image processing method of claim 1, wherein deriving the skeletal hand model includes:
   assembling a depth map including a depth for each IR-skin pixel; and
   identifying, based on one or both of the IR-skin pixels and the depth map, one or more anatomical features of the human hand.

3. The image processing method of claim 2, wherein deriving the skeletal hand model includes estimating, based on one or both of the anatomical features and the depth map, a position of a joint of the human hand.

4. The image processing method of claim 3, wherein estimating the hand joint position includes:
   computing a hash for the depth map;
   selecting a previously-validated depth map from a database of previously-validated depth maps whose hash best corresponds to the computed hash of the depth map, each previously-validated depth map having a skeletal hand model including a plurality of hand joints; and
   assigning a position of a hand joint from the hand model corresponding to the selected previously-validated depth map to the hand joint position.

5. The image processing method of claim 3, wherein deriving the skeletal hand model includes using at least one randomly perturbed hand joint position estimated from a previous-frame depth map to minimize an error function defined as a function of a spatial correspondence between the skeletal hand model and the IR-skin pixels.

6. The image processing method of claim 3, wherein deriving the skeletal hand model includes:

applying a previously-trained machine learning algorithm to one or both of the depth map and the estimated hand joint position; and assigning at least one hand joint position determined by the previously-trained machine learning algorithm to the skeletal hand model, the previously-trained machine learning algorithm trained with training data including a training set of two-dimensional IR images and ground truth annotations of the training set of two-dimensional IR images.

7. The image processing method of claim 6, wherein the previously-trained machine learning algorithm receives as input at least one hand joint position estimated from a previous-frame depth map.

8. The image processing method of claim 1, wherein, for each IR-skin pixel, the depth of the human hand portion imaged by that IR-skin pixel is estimated via a previously-trained machine learning algorithm trained with two-dimensional (2D) IR images and three-dimensional (3D) depth maps annotated with ground truths.

9. The image processing method of claim 8, wherein the 2D IR images include synthetic IR images generated to simulate reflection of IR light by human skin, and/or
the 3D depth maps include synthetic depth maps generated to enable association of depths specified by the synthetic depth maps with corresponding IR intensities specified by the synthetic IR images.

10. The image processing method of claim 1, wherein deriving the skeletal hand model includes:
assembling a depth map including a depth for each IR-skin pixel using a dynamically selected machine learning algorithm previously trained with training data specific to a recognized pose of the human hand.

11. The image processing method of claim 1, wherein the IR-skin pixels are identified based on a predetermined correspondence between a range of IR intensities and human skin.

12. The image processing method of claim 1, wherein the IR-skin pixels are identified based on geometric analysis of the IR image.

13. A computing device, comprising:
an infrared (IR) camera interface configured to receive, from an IR camera, an IR image including a plurality of IR pixels, each IR pixel specifying an IR intensity of that IR pixel;
a logic machine; and
a storage machine holding instructions executable by the logic machine to:
identify, in the IR image, IR-skin pixels that image a human hand;
for each IR-skin pixel, estimate a depth of a human hand portion imaged by that IR-skin pixel based on the IR intensity of that IR-skin pixel; and
derive a skeletal hand model including a plurality of hand joints, each hand joint defined with three independent position coordinates inferred from the estimated depths of each human hand portion.

14. The computing device of claim 13, wherein the instructions to derive the skeletal hand model include instructions to:
assemble a depth map including a depth for each IR-skin pixel; and
identify, based on one or both of the IR-skin pixels and the depth map, one or more anatomical features of the human hand.

15. The computing device of claim 14, wherein the instructions to assemble the depth map include instructions to use a dynamically selected machine learning algorithm previously trained with training data specific to a recognized pose of the human hand.

16. The computing device of claim 14, wherein the instructions to derive the skeletal hand model include instructions to estimate, based on one or both of the anatomical features and the depth map, a position of a joint of the human hand.

17. The computing device of claim 13, wherein the instructions to derive the skeletal hand model include instructions to use at least one hand joint position estimated from a previous-frame depth map.

18. The computing device of claim 13, wherein the instructions to identify the IR-skin pixels include instructions to identify the IR-skin pixels based on a predetermined correspondence between a range of IR intensities and human skin.

19. An image processing method, comprising:
receiving, from a camera, a signal encoding an image including a plurality of pixels, each pixel specifying an IR intensity of that pixel;
identifying, in the image, skin pixels that image a human hand;
for each skin pixel, estimating a depth of a human hand portion imaged by that skin pixel based on the IR intensity of that skin pixel; and
deriving a skeletal hand model including a plurality of hand joints, each hand joint defined with three independent position coordinates inferred from the estimated depths of each human hand portion.

20. The method of claim 19, wherein the camera is selected from the group consisting of an infrared (IR) camera encoding an IR image including a plurality of IR pixels each specifying an IR intensity, an ultraviolet (UV) camera encoding a UV image including a plurality of UV pixels specifying one or more UV parameters, and a visible light (VL) camera encoding a VL image including a plurality of VL pixels specifying one or more VL parameters.

* * * * *